(12) United States Patent
Herter et al.

(10) Patent No.: US 11,304,366 B2
(45) Date of Patent: Apr. 19, 2022

(54) KNIFE BLADE FOR A CUTTING APPARATUS

(71) Applicant: CLAAS Selbstfahrende Erntemaschinen GmbH, Harsewinkel (DE)

(72) Inventors: Felix Herter, Harsewinkel (DE); Norbert Kiffmeier, Harsewinkel (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 78 days.

(21) Appl. No.: 16/935,451

(22) Filed: Jul. 22, 2020

(65) Prior Publication Data
US 2021/0068340 A1 Mar. 11, 2021

(30) Foreign Application Priority Data
Sep. 10, 2019 (DE) .................. 10 2019 124 197.9

(51) Int. Cl.
A01D 34/14 (2006.01)
A01D 34/40 (2006.01)
A01D 34/404 (2006.01)

(52) U.S. Cl.
CPC .......... *A01D 34/14* (2013.01); *A01D 34/404* (2013.01)

(58) Field of Classification Search
CPC ................ A01D 34/14; A01D 34/404
See application file for complete search history.

(56) References Cited

U.S. PATENT DOCUMENTS

| 4,942,728 | A | 7/1990 | Loring | |
| 6,065,380 | A * | 5/2000 | Lundh | B23D 61/121 30/355 |
| 6,467,246 | B1 | 10/2002 | McCredie | |
| 2009/0013847 | A1* | 1/2009 | Lauzet | B23D 61/121 83/846 |
| 2013/0186053 | A1* | 7/2013 | Talbot | A01D 34/18 56/257 |
| 2014/0069249 | A1* | 3/2014 | Collins | A01D 34/13 83/651 |
| 2019/0364726 | A1* | 12/2019 | Schuler | A01D 34/14 |
| 2020/0329635 | A1* | 10/2020 | Smith | A01D 34/03 |

FOREIGN PATENT DOCUMENTS

| EP | 1038427 A1 | 9/2000 |
| EP | 3578027 A1 | 12/2019 |

OTHER PUBLICATIONS

European Search Report dated Nov. 26, 2020 issued in European Application No. 20 18 2870 (with English translation of the relevant parts).

* cited by examiner

*Primary Examiner* — Abigail A Risic
(74) *Attorney, Agent, or Firm* — Collard & Roe, P.C.

(57) ABSTRACT

A knife blade for a cutting apparatus has two cutting edges which are arranged at a substantially triangular cutting portion extending longitudinal to a fastening portion, wherein the cutting edges have areas with different tooth pitches from tooth pitches in other areas.

11 Claims, 2 Drawing Sheets

KNIFE BLADE FOR A CUTTING APPARATUS

CROSS-REFERENCE TO RELATED APPLICATIONS

This application claims priority under 35 USC 119 of German Application No. DE 10 2019 124 197.9, filed on Sep. 10, 2019, the disclosure of which is herein incorporated by reference.

BACKGROUND OF THE INVENTION

The present invention is directed to a knife blade for a cutting apparatus with two cutting edges which are arranged at a substantially triangular cutting portion extending longitudinal to a fastening portion. The present invention is further directed to a cutting apparatus and a header with a cutting apparatus.

A harvesting machine constructed as a combine harvester has a header with a cutting apparatus which harvests the crop by executing a scissor-like severing cut. To this end, a plurality of knife blades are fastened to an oscillatingly driven knife strip. The knife blades cooperate with mowing fingers as counter cutting edges. Cutting apparatuses in which the counter cutting edges likewise comprise knife blades which are either rigidly fastened to a cutter bar or arranged at a further knife rail driven in the opposite direction are also known. Various types of crops, for example, cereals such as wheat, oat, rye, barley, rice and soybeans but also grass, rapeseed, etc., are cut by means of the cutting apparatus.

A knife blade for a cutting apparatus of the type mentioned in the introductory part is known from EP 1 038 427 B1. The knife blade has two cutting edges which are arranged at a substantially triangular cutting portion which extends longitudinal to a fastening portion.

Knife blades with different tooth pitches, i.e., with a different quantity of teeth per unit of length, are used for harvesting depending on the type of crop. Accordingly, a knife blade with a coarse tooth pitch, i.e., a small quantity of teeth per unit of length, is used with cereals in general, while a knife blade with a fine tooth pitch, i.e., a large quantity of teeth per unit of length, should be used under difficult harvesting conditions or cutting conditions which are caused in particular by the type of crop, for example, grass or rice.

A refitting of the header to adapt to the respective type of crop to be harvested by changing the knife blades of the cutting apparatus entails a large expenditure of labor and time.

SUMMARY OF THE INVENTION

The invention has the object of providing a knife blade of the type described in the introduction which can cover a broader spectrum of crop types to be cut.

This object is met according to the invention by a knife blade, a cutting apparatus, a header and a chopping arrangement of a self-propelled harvesting machine having the features described below.

A knife blade for a cutting apparatus has two cutting edges which are arranged at a substantially triangular cutting portion extending longitudinal to a fastening portion, wherein the cutting edges have different tooth pitches in some areas. One area has at least two identically shaped teeth. The construction of the knife blade with cutting edges having different tooth pitches in some areas forms a kind of universally usable knife blade, the use of which is less dependent on the crop type and cutting conditions resulting therefrom. The respective tooth pitch of the areas is oriented substantially to the type of crop to be cut or to the existing harvesting conditions and possibly to a forward driving speed. A further advantage consists in that the service life or duration of use of the knife blade is appreciably longer compared to a knife blade with a uniform tooth pitch, since especially the lower area is less subject to wear.

The cutting edges can be divided into at least two parallelly extending areas with different tooth pitches. As a result of dividing into at least two areas, an area can be formed which allows, e.g., in a cereal stand, high forward driving speeds of a harvesting machine on which the header is arranged. At least one further area allows, e.g., grass or rice to be harvested by the same knife blade under difficult harvesting conditions at a lower forward driving speed.

In a lower area extending portion-wise in the direction of knife blade tip proceeding from the fastening portion, the quantity of teeth may preferably be less than in an upper area which extends up to the knife blade tip. In an arrangement with two areas, the upper area adjoins the lower area. However, it is also possible to provide at least one middle area with a tooth pitch that is between the tooth pitch of the upper area and the tooth pitch of the lower area. The lower area of the knife blade takes effect for cutting cereals or the like at high forward driving speeds, while the upper area takes effect for cutting under difficult harvesting conditions at a lower forward driving speed. For example, the harvesting of fibrous crops such as grass or the like requires a low forward driving speed so that substantially only the upper area of the knife blade acts on the crop.

In particular, the tooth pitch in the upper area can correspond to an integral multiple of the tooth pitch in the lower area. Further, the lower area can extend in longitudinal direction of the knife blade over at least one half of the longitudinal extension of the cutting portion of the knife blade. In a particularly preferable manner, the lower area can extend over 60% to 80% of the longitudinal extension of the cutting portion, while the upper area preferably extends over 40% to 20% of the longitudinal extension of the cutting portion. The comparatively small longitudinal extension of the upper area is sufficient especially at slow forward driving speeds, e.g., below 5 km/h, so that the crop is cut substantially in the upper area of the knife blade.

The upper area can preferably have a tooth pitch which corresponds to a quantity between 13 and 15 teeth per inch.

Further preferably, the lower area can have a tooth pitch which corresponds to a quantity between 6 and 8 teeth per inch. Accordingly, a higher forward driving speed can be achieved through the coarser tooth pitch when harvesting cereals.

In particular, the knife blade can be constructed in one part and can form a double blade with a second knife blade.

The knife blade according to the invention can also be used on a rotating chopping arrangement of a self-propelled harvesting machine such as a combine harvester or a forage harvester.

Beyond this, the knife blade according to the invention can be applied in all agricultural work devices or agricultural work machines having apparatus for cutting and/or comminuting crops.

Further, the above-stated object is met by a cutting apparatus with at least one oscillatingly driven knife strip at which is arranged a plurality of knife blades constructed according to the invention. The cutting apparatus can also have two knife strips which are oscillatingly driven, and the two knife strips are driven out of phase. The cutting apparatus can be constructed as a cutter bar of a cutting unit and/or as a side cutting knife, also called rapeseed knife.

In particular, the cutting apparatus can be constructed as a double-knife cutting apparatus. Two knife strips can be provided for this purpose, the knife blades according to the invention being arranged at the latter in each instance.

Further, the above-stated object is met by a header with a cutting apparatus that can be constructed as a horizontally extending cutter bar of the header or as severing knives, so-called rapeseed knives, arranged vertically at the header.

Further, the above-stated object is met through a chopping arrangement of a self-propelled harvesting machine with knife blades according to the invention. The chopping arrangement which is driven for rotation around an axis comprises knife blades which are arranged so as to be distributed over its circumference and which serve to cut or chop crops in cooperation with counter-knives.

BRIEF DESCRIPTION OF THE DRAWINGS

The present invention will be described in more detail in the following referring to an embodiment example shown in the drawings. The drawings show.

DETAILED DESCRIPTION OF THE EMBODIMENTS

Figure 1:
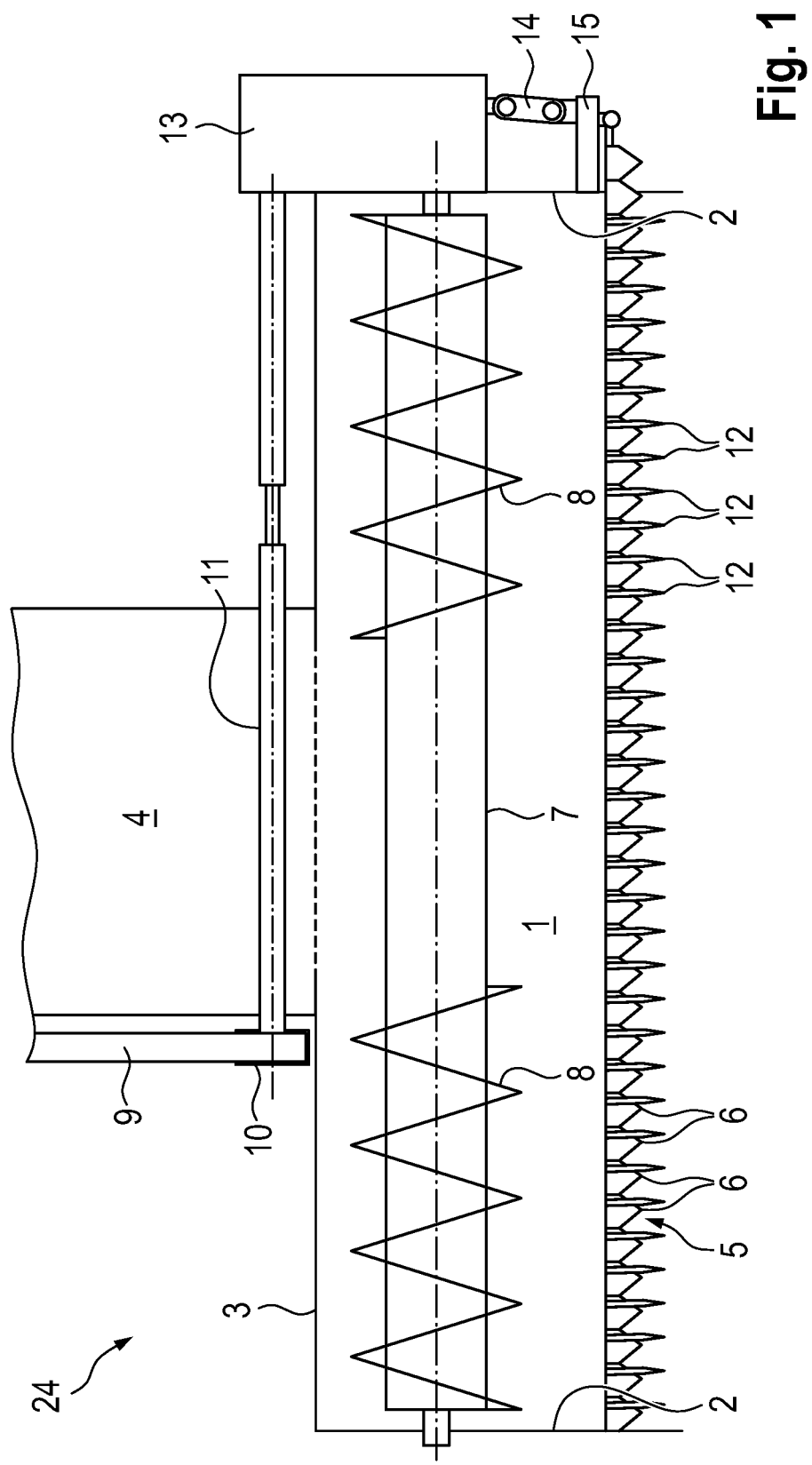
FIG. 1 a schematic top view of a header.

The diagram in FIG. 1 shows a schematic top view of a header 24 for use in a self-propelled harvesting machine, not shown in further detail, particularly a combine harvester. A carrier frame of the header 24 comprises a substantially horizontal bottom plate 1, vertical side panels 2 at a left-hand and right-hand edge of the bottom plate 1, and a back wall 3 which connects the rear edges of the bottom plate 1 and side panels 2. The bottom plate 1 can be constructed from multiple parts so that a front part of the bottom plate 1 is moveable in horizontal direction relative to a rear part of bottom plate 1. The back wall 3 has a central opening adjoined by an inclined conveyor 4 of the harvesting machine. A cutting apparatus 5 constructed as a cutter bar is arranged at the front edge of the bottom plate 1. The cutting apparatus 5 has at least one oscillatingly driven, horizontally displaceable knife strip. A plurality of knife blades 6 which are substantially triangular viewed from the top are arranged at the knife strip. At the front edge of the bottom plate 1, fixedly mounted, forwardly projecting fingers 12 have slots which are open to the rear and into which the knife blades 6 engage so as to be moveable in transverse direction. Diagonal cutting edges of the knife blades 6 pass over lateral edges of the fingers 12 so that crops coming within range of the latter are cut and fall onto the bottom plate 1. An intake roller 7 which is rotatably mounted between the side panels 2 is outfitted with oppositely running augers 8 which push the cut crop from the sides of the bottom plate 1 to the center and feed it to the inclined conveyor 4.

An exemplary drivetrain common to the cutting apparatus 5 and intake roller 7 comprises in this instance a belt 9 driven by a motor of the harvesting machine and a shaft 11 which carries a belt pulley 10 around which the belt 9 is looped and which extends substantially parallel to the back wall 3 into a gear unit assembly 13 at the right-hand side panel 2. The gear unit assembly 13 drives the intake roller 7 on the one hand and the at least one knife strip on the other hand via an articulated shaft 14 and an eccentric 15. Alternative drive types at least of the cutting apparatus 5 are conceivable, for example, an electromechanical linear drive.

Figure 2:
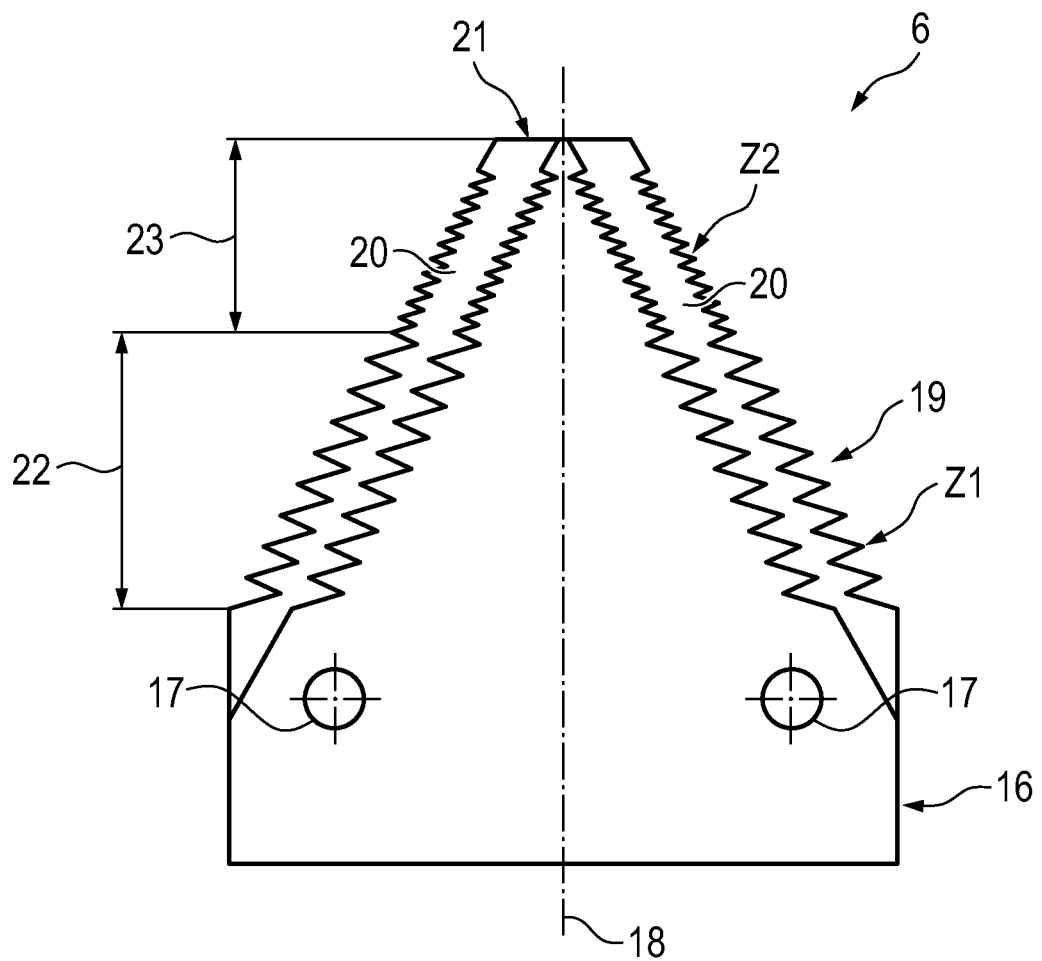
FIG. 2 a schematic plan view of a knife blade arranged at the cutter bar of the header.

FIG. 2 shows a schematic plan view of an individual knife blade 6 which is detachably arranged at the cutting apparatus 5 of the header 24. The knife blade 6 has a fastening portion 16 which is provided with through-holes 17. Fastening means, for example, rivets or screws, can be guided through the through-holes 17. A longitudinal axis of the knife blade 6 which is simultaneously also an axis of symmetry is designated by 18. A substantially triangular cutting portion 19 extends longitudinal to the fastening portion 16. Two cutting edges 20 are arranged opposite one another at the cutting portion 19. The cutting edges 20 extend from the fastening portion 16 to the knife blade tip 21 in longitudinal direction of the knife blade 6. The cutting edges 20 are formed mirror-symmetric to the longitudinal axis 18.

The cutting edges 20 are divided in each instance into at least two areas 22, 23 which extend parallel, i.e., opposite one another, and have different tooth pitches Z1, Z2. Each area 22, 23 has at least two identically formed teeth.

The tooth pitch Z1, Z2 represents the quantity of teeth of an area 22, 23 of the cutting edges 20 per unit of length. In a lower area 22 which extends portion-wise in direction of the knife blade tip 21 proceeding from the fastening portion 16, the quantity of teeth is less than in an upper area 23 extending up to the knife blade tip 21. In the lower area 22, for example, the quantity of teeth amounts to between 6 and 8 teeth per inch. In the upper area 23, for example, the quantity of teeth amounts to between 13 and 15 teeth per inch. Particularly preferably, the quantity of teeth in the lower area 22 can correspond to 7 teeth per inch and the quantity of teeth in the upper area 23 can correspond to 14 teeth per inch. Accordingly, the tooth pitch Z2 in the upper area 23 corresponds to an integral multiple of the tooth pitch Z1 in the lower area 22. Further, at least one central area can be provided, within which the quantity of teeth is between 9 and 11 teeth per inch for example. In this way, a transition area can be formed between the lower area 22 and the upper area 23 which is operative at medium forward driving speeds of the harvesting machine carrying the header 24 during the cutting of crops.

The lower area 22 can preferably extend in longitudinal direction of the knife blade 6 over at least one half of the longitudinal extension of the cutting portion 19 of the knife blade 6. In a particularly preferable manner, the lower area 22 extends over 60% to 80% of the longitudinal extension of the cutting portion 19, while the upper area 23 preferably extends over 40% to 20% of the longitudinal extension of the cutting portion 19.

The utilization of the knife blade 6 according to the invention is not limited to a cutting apparatus 5 of a header 24. Beyond this, use in a chopping arrangement of the combine harvester or of a forage harvester is conceivable. The knife blades 6 according to the invention can also be applied to a severing knife, also called rapeseed knife, which can be mounted laterally at the header 24.

In principle, the knife blade according to the invention can be applied in all agricultural work implements or agricultural work machines having apparatus for cutting and/or comminuting crops.

REFERENCE CHARACTERS 1 bottom plate
2 side panel
3 back wall 4 inclined conveyor
5 cutting apparatus
6 knife blade
7 intake roller
8 auger
9 belt
10 belt pulley
11 shaft
12 finger
13 gear unit assembly
14 articulated shaft
15 eccentric
16 fastening portion
17 through-hole
18 longitudinal axis of 6
19 cutting portion
20 cutting edge
21 knife blade tip
22 lower area
23 upper area
24 header
Z1 tooth pitch
Z2 tooth pitch

What is claimed is:

1. A knife blade for a cutting apparatus, comprising a substantially triangular cutting portion connected to and extending longitudinally on a fastening portion, and two cutting edges which are arranged on the cutting portion, wherein each of the cutting edges have areas with tooth pitches that are different from tooth pitches in other areas, wherein a lower area of the knife blade starting from the fastening portion has a quantity of teeth that is less than a quantity of teeth in an upper area of the knife blade extending to the knife tip.

2. The knife blade according to claim 1, wherein the cutting edges are divided into at least two parallelly extending areas with different tooth pitches.

3. The knife blade according to claim 1, wherein the tooth pitch in the upper area corresponds to an integral multiple of the tooth pitch in the lower area.

4. The knife blade according to claim 1, wherein the lower area extends over at least one half of a total longitudinal extension of the cutting portion of the knife blade.

5. The knife blade according to claim 1, wherein the upper area has a tooth pitch which corresponds to a quantity between 13 and 15 teeth per inch.

6. The knife blade according to claim 1, wherein the lower area has a tooth pitch which corresponds to a quantity between 6 and 8 teeth per inch.

7. The knife blade according to claim 1, wherein the knife blade is formed of one part and forms a double blade with a second knife blade.

8. A cutting apparatus with at least one oscillatingly driven knife strip at which is arranged a plurality of knife blades constructed according to claim 1.

9. The cutting apparatus according to claim 8, wherein the cutting apparatus is constructed as a double-knife cutting apparatus.

10. A header with a cutting apparatus according to claim 8.

11. A chopping arrangement of a self-propelled harvesting machine with knife blades formed according to claim 1.

* * * * *